March 20, 1956     J. FALLON ET AL     2,738,855
APPARATUS FOR SEPARATING DUST FROM GASES
Filed April 28, 1953     2 Sheets-Sheet 1

INVENTORS
JOHN FALLON
CHARLES GEORGE McKEOWN

BY Marshall, Marshall and Yeasting
ATTORNEYS

March 20, 1956  J. FALLON ET AL  2,738,855
APPARATUS FOR SEPARATING DUST FROM GASES
Filed April 28, 1953  2 Sheets-Sheet 2
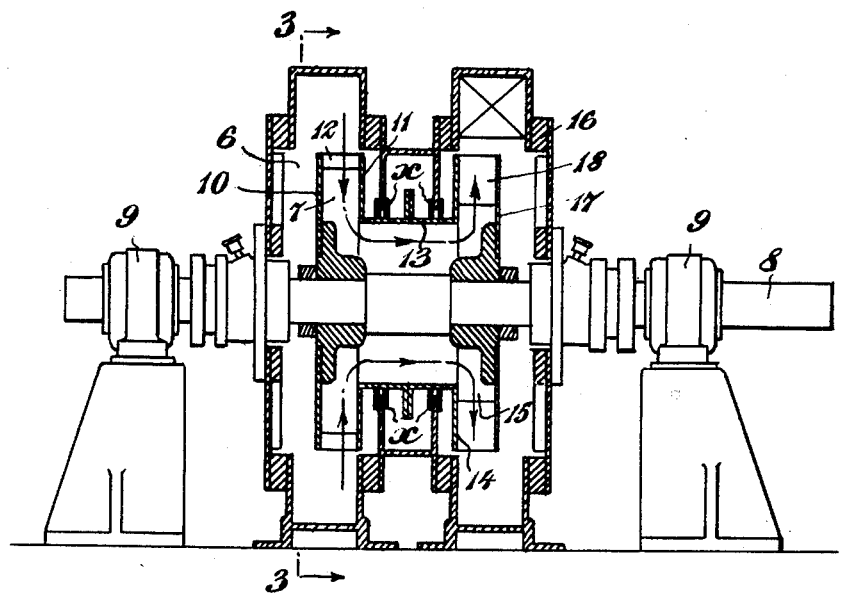
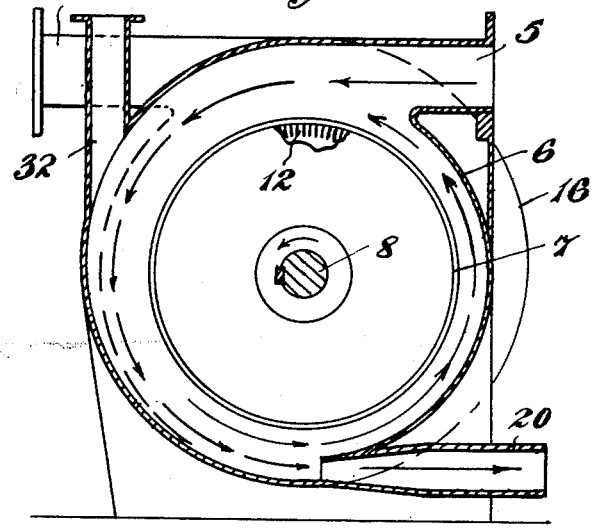
INVENTORS
JOHN FALLON
CHARLES GEORGE McKEOWN
BY
*Marshall, Marshall & Yeasting*
ATTORNEYS

United States Patent Office 2,738,855
Patented Mar. 20, 1956

2,738,855

APPARATUS FOR SEPARATING DUST FROM GASES

John Fallon, Olton, Birmingham, and Charles George McKeown, Dudley, England

Application April 28, 1953, Serial No. 351,612

1 Claim. (Cl. 183—34)

This invention relates to an improved apparatus for separating dust from gases and relates particularly to apparatus of the kind wherein the dust laden gas is introduced tangentially into a centrifugal separating chamber containing a positively rotatable hollow rotor into which the clean gas enters through a gridded or perforated periphery to be discharged through an axial passageway to an outlet.

With apparatus of the aforesaid kind it has been usual practice to provide at the bottom of the centrifugal separating chamber a hopper into which the dust can fall by gravity and from whence it can be extracted through an opening and it will be understood that with such apparatus due to the turbulence within the centrifugal separating chamber dust tends to be re-entrained in the gas in an endeavour to rejoin the main gas flow through the rotor to the outlet.

The object of the present invention is to provide a simple and effective apparatus for separating dust particles from gases which is particularly suitable for gases at a pressure substantially above atmospheric pressure and where it is not desired to cool or increase the humidity of the gases which renders separating processes involving washing with liquid sprays unsuitable.

The invention consists of apparatus for separating dust from gases of the kind referred to wherein the dust and a proportion of the gases are discharged through a tangential outlet to an external dust extractor, the clean gases from which are reintroduced tangentially into the separating chamber.

A convenient embodiment of the present invention will now be described with particular reference to the accompanying drawings in which:

Fig. 2 is a sectional side elevation of the centrifugal separating chamber and associated outlet chamber.

Fig. 3 is a section on the line 3—3 of Fig. 2 and

Figure 1:
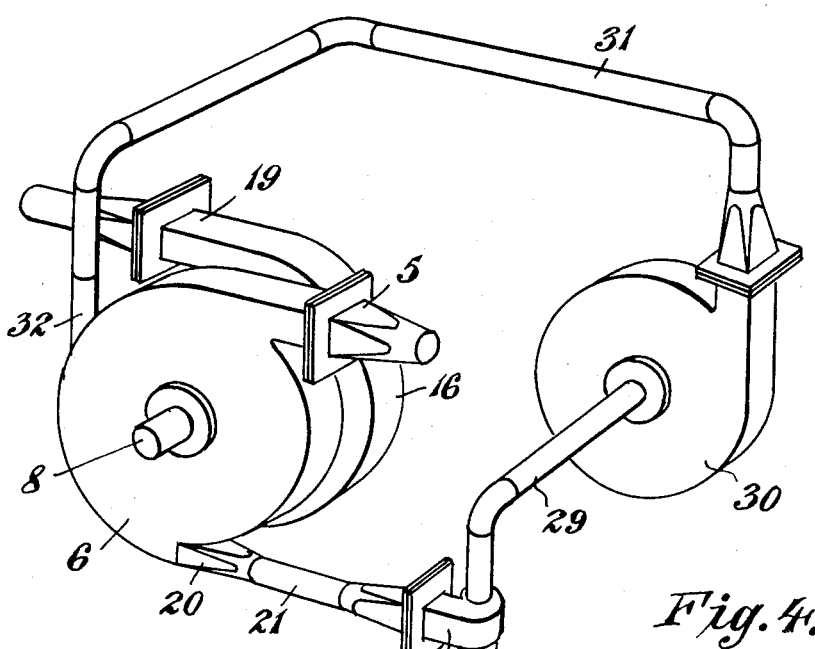
Fig. 1 is a general perspective view of the apparatus with the bearings of the rotor shaft and pedestals therefor omitted.
Figure 4:
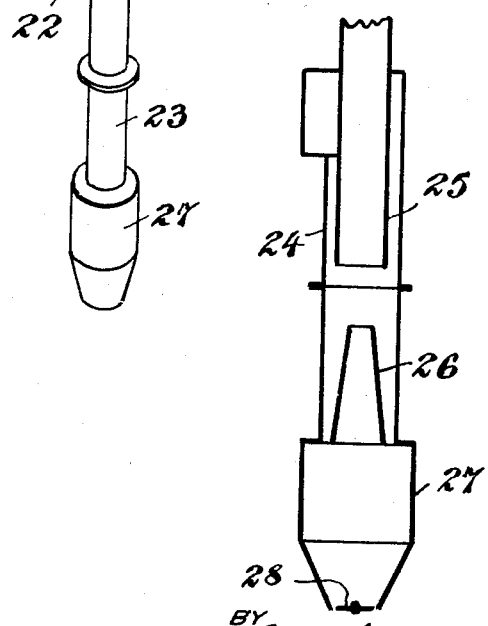
Fig. 4 is a vertical section through the external dust extractor illustrated in Fig. 1.

The dust laden gas to be cleaned is adapted to be introduced through the tangentially disposed inlet port 5 into the separating chamber 6 within which is a rotor 7 mounted on a positively rotatable shaft 8 journalled in bearings 9 exterior to the chamber. The rotor 7 comprises a circular disc 10 keyed to the shaft 8 and spaced therefrom a parallel concentric annular disc 11 of equal diameter, the periphery of the discs 10 and 11 being interconnected by a plurality of radially disposed vanes 12. The annular disc 11 of the rotor 7 has connected to its central aperture a tubular sleeve 13 which concentrically surrounds the shaft 8 in spaced relationship and is connected at its opposite end to another annular disc 14 forming part of a rotor 15 in an outlet chamber 16. The rotor 15 in the outlet chamber 16 in addition to the annular disc 14 comprises an imperforate disc 17 keyed to the shaft 8, the discs 14 and 17 being interconnected in parallel spaced relationship by radially disposed vanes 18. The clean gas from the separating chamber 6 is adapted to enter the interior of the hollow rotor 7 between the vanes 12 and to pass through the sleeve 13 from the rotor 15 between the vanes 18 to be discharged from the outlet chamber 16 through a tangentially disposed outlet 19. The passage of gas from the separating chamber 6 to the outlet chamber 16 on the exterior of the sleeve 13 is prevented by the provision of annular asbestos seals $x$ connected to the adjacent walls of the respective chambers and bearing against the exterior of the sleeve 13.

The outlet chamber 16 is of the scroll type, that is to say, the diameter of the chamber 16 increases towards the tangential outlet 19. The separating chamber 6 is also of the scroll type but of opposite hand and decreases in diameter from the tangentially disposed inlet 5 to a point disposed substantially 180° therefrom and at the bottom of the chamber, at which point is provided a tangentially disposed outlet 20 which is connected by piping 21 to the scroll type inlet 22 of a dust extractor 23.

Briefly describing this dust extractor 23 the construction of which forms no part of the present invention, the gas entering through the scroll type inlet 22 descends through an annular space between the wall 24 of the cylindrical casing and the exterior of a concentrically disposed outlet tube 25 so that the gas partakes of a downward spiral path with the result that any dust contained in the gas is forced by centrifugal action against the wall 24 of the cylindrical casing. When the gas enters the portion of the casing below the lower extremity of the outlet tube 25 the speed of rotation of the gas decreases due to the increase in cross sectional area of the casing with a corresponding reduction in the centrifugal force holding the dust particles against the wall 24 of the casing, to permit the dust particles to fall through apertures between the wall 24 of the casing and a concentrically disposed cone 26 into a dust receiving hopper 27 from whence they can be extracted through a valve 28.

The outlet tube 25 for clean gas is connected by tubing 29 to a scroll type casing 30 containing a positively rotatable impellor which passes the clean gas through piping 31 to a tangentially disposed inlet 32 in the separating chamber 6 which is disposed between the inlet 5 and outlet 20 thereof.

In operation the dust laden gas enters the scroll type separating chamber 6 through the inlet 5 in the direction of rotation of the rotor 7 and due to the decreasing diameter of the peripheral wall of the casing against which it is directed and the rotation of the rotor the centrifugal force acting on the dust particles is kept at a maximum resulting in a highly concentrated dust layer scrubbing the internal periphery of the chamber 6 at a point 180° remote from the inlet port 5. As a result of this scrubbing action the majority of the dust with a proportion of gas is discharged through the outlet 20 to the dust extractor 23. The clean gas leaving the extractor 23 is reintroduced tangentially into the chamber 6 through the inlet 32 under the action of the impellor within the casing 30. Clean gas within the inlet chamber 6 continues its flow in the direction of the rotation of the rotor 7 until it reaches the periphery of the rotor and is forced through the blades 12 into the interior of the rotor. It will be understood that any dust still remaining in the gas will again tend to be discharged by the centrifugal action of the rotor but the clean gas will flow axially through the sleeve 13 into the rotor 15 and be discharged therefrom between the vanes 18 and finally discharged from the outlet chamber 16 through the outlet 19.

We claim:

A high speed centrifugal dust separator for separating dust from gases comprising, in combination, a pair of chambers having scroll type peripheries, said chambers being substantially identical except that their scroll type peripheries are of opposite hand, a pair of substantially identical and opposed vaned hollow centrifuging rotors fixed upon a common rotatable shaft which extends through coaxial openings in said chambers, each rotor being located within one of said chambers to whirl gas therein and thereby impel dust particles toward the periphery, a tubular passageway surrounding said rotatable shaft and connecting the interiors of said hollow rotors, said hollow rotors having peripheral openings from their interiors, the radius of said tubular passageway being less than the distance of said peripheral openings from the axis of rotation of said rotors, the periphery of one of said chambers having an inlet port through which gas to be treated may be supplied, the periphery of the other of said chambers having an outlet port through which treated gas may be discharged, an external dust collector, an external impeller and a conduit leading in a circuit from the lower side of the chamber whose periphery has the said inlet port to said external dust collector, said impeller and thence to another side of said chamber.

References Cited in the file of this patent

UNITED STATES PATENTS

| | | |
|---|---|---|
| 911,802 | Baldwin | Feb. 9, 1909 |
| 1,760,617 | Whitmore | May 27, 1930 |
| 1,928,702 | O'Mara | Oct. 3, 1933 |
| 2,328,220 | Linderoth | Aug. 31, 1943 |
| 2,367,906 | Wall et al. | Jan. 23, 1945 |
| 2,482,642 | Sylvan | Sept. 20, 1949 |